(12) United States Patent
Sanger

(10) Patent No.: US 7,488,359 B1
(45) Date of Patent: Feb. 10, 2009

(54) COMPACT REFORMER AND WATER GAS SHIFT REACTOR FOR PRODUCING VARYING AMOUNTS OF HYDROGEN

(75) Inventor: Robert J. Sanger, Chicago, IL (US)

(73) Assignee: HyRadix, Inc., Des Plaines, IL (US)

( * ) Notice: Subject to any disclaimer, the term of this patent is extended or adjusted under 35 U.S.C. 154(b) by 1036 days.

(21) Appl. No.: 10/731,352

(22) Filed: Dec. 9, 2003

Related U.S. Application Data

(60) Provisional application No. 60/434,864, filed on Dec. 19, 2002.

(51) Int. Cl.
*B01J 8/00* (2006.01)

(52) U.S. Cl. .................. 48/61; 48/78; 48/85; 48/127.9

(58) Field of Classification Search ................. 48/198.3
See application file for complete search history.

(56) References Cited

U.S. PATENT DOCUMENTS

| | | | | |
|---|---|---|---|---|
| 4,008,692 A | * | 2/1977 | Shinohara et al. ............. | 123/3 |
| 4,344,850 A | * | 8/1982 | Grasso ......................... | 210/664 |
| 5,052,482 A | * | 10/1991 | Gondouin ..................... | 166/50 |
| 6,162,267 A | | 12/2000 | Priegnitz et al. ....... | 48/199 FM |
| 6,375,924 B1 | | 4/2002 | Towler et al. ................ | 423/656 |
| 7,066,973 B1 | * | 6/2006 | Bentley et al. ............. | 48/197 R |
| 2001/0002248 A1 | | 5/2001 | Ukai et al. ................... | 423/652 |
| 2001/0014300 A1 | | 8/2001 | Hashigaya et al. .......... | 422/195 |
| 2002/0094310 A1 | | 7/2002 | Krause et al. ................ | 422/191 |
| 2002/0152680 A1 | | 10/2002 | Callaghan et al. .......... | 48/127.9 |

\* cited by examiner

*Primary Examiner*—Alexa D Neckel
*Assistant Examiner*—Imran Akram
(74) *Attorney, Agent, or Firm*—Stephen A. Gratton

(57) ABSTRACT

Apparatus and processes are provided for the generation of hydrogen which employ a reformer and water gas shift reactor. The apparatus and processes respond quickly to changes in hydrogen generation. The reformate in a region between the reformer and prior to exiting the water gas shift reactor is cooled by indirect heat exchange with water whereby substantially all the water is vaporized to steam, the steam is separated from liquid water and then introduced into the reformate.

7 Claims, 2 Drawing Sheets

COMPACT REFORMER AND WATER GAS SHIFT REACTOR FOR PRODUCING VARYING AMOUNTS OF HYDROGEN

CROSS-REFERENCE TO RELATED APPLICATION

This application claims priority from Provisional Application Ser. No. 60/434,864 filed Dec. 19, 2002, the contents of which are hereby incorporated by reference.

FIELD OF THE INVENTION

This invention relates to a compact apparatus and methods for generating hydrogen which apparatus and methods provide the capability to respond rapidly to changes in hydrogen demand. More particularly, this invention relates to a compact hydrogen generating apparatus and methods suitable for use in conjunction with a fuel cell.

BACKGROUND OF THE INVENTION

Fuel cells convert hydrogen and oxygen to water, releasing energy as usable electricity without employing combustion as an intermediate step. Unfortunately, the use of fuel cells has been limited especially where a rapid change in electricity demand is required such as in residential applications. The problem is that the rate of hydrogen supply to the fuel cell must rapidly change in order to accommodate varying electrical loads.

One could use a reservoir of hydrogen from which to supply the fuel cell, and the replenishment of hydrogen to the reservoir would therefore not be subjected to accommodating the rapid changes in hydrogen demand. However, such a solution is impractical, especially for residential use, due to difficulties and risks associated with such storage. Moreover, hydrogen storage equipment adds to the size and cost thereby reducing the attractiveness of a fuel cell for residential use. Alternatively, electricity could be stored in batteries, which serve as a buffer between the fuel cell system and the electrical load. Batteries, especially of the volume required to meet the needs of residential units, also add to the cost and size of the fuel cell system. Moreover, batteries have a limited life and must be replaced. Another approach is to store electricity in a super capacitor. While the size and cost of a super capacitor may be attractive, the disadvantage is the limited storage capacity.

Ideally, hydrogen would be generated on-site on an as needed basis for the fuel cell by the reforming (e.g., steam reforming and autothermal reforming) of fuels such as methanol, ethanol, natural gas, propane, butane, gasoline and diesel. Such fuels have high energy storage densities, have conventional storage protocols and have a nationwide supply infrastructure.

Although technology exists for the generation of hydrogen by reforming fuels, the implemented production processes are not able to quickly change the rate of hydrogen generation so as to be useful in a residential fuel cell application. For instance, hydrogen is widely produced for chemical and industrial purposes by converting suitable fuel materials such as hydrocarbons and methanol in a reforming process to produce a synthesis gas. Such chemical and industrial production usually takes place in large facilities that operate under steady-state conditions.

On-site hydrogen supply for fuel cells used in smaller mobile and stationary facilities, including residential-scale facilities, poses substantial problems even without the added complexities of operating at varying production rates. For instance, hydrogen generators for fuel cells must be smaller, simpler and less costly than hydrogen plants for the generation of industrial gases. Furthermore, hydrogen generators for use with fuel cells will need to be integrated with the operation of the fuel cell such that energy storage requirements are minimized. Moreover, the hydrogen generators must in combination with the fuel cells, be economically viable both in terms of purchase cost and cost of operation, and they must be sufficiently compact to meet consumer desires.

The challenge associated with providing smaller scale hydrogen generators is readily apparent from the number of unit operations required to convert fuel to hydrogen suitable for use in a fuel cell. The fuel must be brought to temperatures suitable for reforming which are often in excess of 600° C. The fuel is reformed to produce hydrogen and carbon monoxide, and the reformate is subjected to water gas shift at lower temperatures to convert carbon monoxide and water to hydrogen and carbon dioxide. Residual carbon monoxide is removed from the hydrogen-containing gas. Additionally, pre-treatment operations are generally required to treat the fuel to remove sulfur, a catalyst poison.

These unit operations must be conducted in an energy efficient manner. Consequently, the overall process should be highly heat integrated. As can be readily appreciated, changes in hydrogen production would be expected to take some time as each of the unit operations and heat exchange operations respond. The severity of the problem in changing hydrogen generation rates is exacerbated in that the range of operation of residential units needs to be quite wide, often the turndown ratio must be at least 5:1.

The difficulties in providing a hydrogen generator for use with fuel cells is further exacerbated because carbon monoxide is a poison to fuel cells. The water gas shift reaction is the primary operation used in a hydrogen generator to remove carbon monoxide generated by the reforming of the fuel. Any upset in the operation of the water gas shift reactor can result in an increase in carbon monoxide that must be removed in downstream treatment of the hydrogen-containing gas. While redundant capacity for carbon monoxide removal (e.g., a selective oxidation) may be used in downstream operations to handle spikes in carbon monoxide production, such an approach will incur a penalty in process efficiency and product purity, as well as compactness and cost of the system. Accordingly, the hydrogen generator must be able to accommodate changes in the hydrogen production rate without adversely effecting the water gas shift operation.

Another problem area in the providing hydrogen generators, especially compact hydrogen generators for fuel cell systems, is to cool the reformate to temperatures suitable for the water gas shift reaction. The use of indirect heat exchange has posed problems due to the inherent lag time required when the production rate of hydrogen is changed. Proposals have included cooling by injecting liquid water into the reformate. The injection rate can rapidly respond to a change in the hydrogen production rate and adequate cooling can be obtained with relatively small amounts of liquid water due to the high latent heat of vaporization. Additionally, as the water gas shift reaction is an equilibrium reaction, the additional water has some benefit in shifting the equilibrium to the production of hydrogen.

U.S. Pat. Nos. 6,162,267 and 6,375,924 disclose a reformer and a separate vessel containing a high temperature water gas shift zone and a low temperature water gas shift zone for generating hydrogen with reduced carbon monoxide content. Water is introduced as a spray above each of the shift zones to control temperature.

US Patent Application Publication 2002/0152680 discloses a fuel cell system in which liquid water is injected between the reformer and the water gas shift reactor to cool the reformate. The liquid water is atomized and/or injected on a high surface area material to assist in the cooling.

However, the injection of liquid water poses difficulties in that the water must be essentially completely vaporized prior to contact with the water gas shift catalyst. The presence of liquid water on the water gas shift catalyst can result in deterioration in performance, thereby increasing the potential of carbon monoxide breakthrough to the fuel cell. Additionally, atomization of liquid water and the use of high surface area contact surfaces such as steel wool, ceramic pellets, and honeycomb monoliths which serve to prevent the passage of liquid water to the water gas shift catalyst, pose disadvantages. For instance, atomization nozzles may not be able to perform adequately over the wide range of hydrogen production rates sought for residential units, and atomization nozzles may require maintenance. The use of high surface area structures results in a pressure drop, may not be effective in assuring complete vaporization of the water, and additional energy will have to be consumed in compression of the gases passing through the hydrogen generator.

An unpublished effort known to the inventor used a coiled tube within the passage between the reformer and the water gas shift reactor. Liquid water was introduced into the tube. Indirect heat exchange with the reformate converted the liquid water to steam, and the steam was released at the end of the coil. Difficulties existed in obtaining a uniform temperature reduction across the cross section of the passage and in providing a nozzle at the end of the tube for introducing the steam into the reformate.

US Patent Application Publication 2002/0094310 discloses a compact fuel processor using a plurality of modules stacked end-to-end.

US Patent Application Publication 2001/0002248 discloses a hydrogen generating apparatus having heat integration and the asserted ability to provide a constant hydrogen concentration over a range of hydrogen production rates.

US Patent Application Publication 2001/0014300 discloses a reformer controlling apparatus using downstream detectors to control the fuel to air ratio and the amount of fuel and air.

Apparatus and processes are sought which can handle a wide range of throughputs and overcome the inherently slow thermal response of system components, especially the reformer and water gas shift reactor with associated heat exchangers, without risking undue fluctuations in carbon monoxide production. Moreover, the technology should be economically viable for a compact unit providing hydrogen to a fuel cell and not render the compact unit so complex that it is not sufficiently reliable for residential use.

SUMMARY OF THE INVENTION

In accordance with this invention apparatus and processes are provided for the generation of hydrogen which employ a reformer (e.g., steam or autothermal) and water gas shift reactor. The reformer and water gas shift reactor can be positioned closely to each other. The invention permits the generator to be relatively compact and to respond quickly to changes in hydrogen demand while preventing undue fluctuations in carbon monoxide in the water gas shift reactor effluent. A cooling section between the reformer and the shift reactor uses injected liquid water to cool the reformate by taking advantage of latent and sensible heat of water. The cooling section is operable over a wide range of hydrogen production rates, yet still can rapidly respond to changes in the hydrogen production rate.

The hydrogen generators of this invention comprise a reformer for converting a fuel and either steam or steam and oxygen into a reformate containing hydrogen and carbon oxides; a downstream shift reactor for converting carbon monoxide in the reformate with water to carbon dioxide and hydrogen, said shift reactor having at least one catalyst stage; a conduit from the reformer and encompassing the shift reactor for passing the reformate through the shift reactor; and a heat exchanger/distributor within the conduit for cooling the reformate prior to exiting the conduit, said heat exchanger/distributor comprising:

(a) an indirect heat exchanger adapted to received liquid water and having sufficient surface area to vaporize the received water to steam and adapted to cool the reformate in the conduit, (b) at least one separator in fluid communication with the indirect heat exchanger adapted to receive steam from the indirect heat exchanger and remove substantially all liquid water, and (c) at least one steam distributor in fluid communication with the separator to pass the steam into the reformate.

In the processes of this invention, reformate from a reformer for the conversion of fuel to hydrogen and carbon oxides is subjected to indirect heat exchange with liquid water, said water being provided at a rate sufficient to cool the reformate while being substantially completely converted to steam; separating the steam from the liquid water; and passing the separated steam into the reformate. The indirect heat exchange and the passing of the steam into the reformate in the processes of this invention may occur immediately subsequent to the reformer or during (i.e., between catalyst stages) or after any water gas shift used to treat the reformate.

One of the advantages of the apparatus and processes of this invention is that the cooling of the reformate can be accomplished without the need to introduce liquid water directly into the reformate. Thus, the risk of adversely affecting the performance of shift catalyst is mitigated. Devices to remove entrained water, which would increase pressure drop to the reformate stream, are not necessary as the removal of water is done prior to the introduction of the steam into the reformate. Further, any pressure drop losses occur only with respect to the introduced water, which is a small amount in comparison to the amount the reformate.

Additionally, since all the liquid water being introduced into the heat exchanger/distributor is converted to steam, the mass of liquid water in the heat exchanger/distributor at any given time is relatively small and quickly converted to steam. Because only a minimal mass of liquid water contained in the heat exchanger/distributor, rapid transitions to different hydrogen production rates can be accomplished. Sufficient surface area is provided within the indirect heat exchanger that in operation, the amount of water (liquid and steam) present is less than about 1, preferably less than about 0.5, minute supply.

Heat exchange with the reformate can occur both by indirect heat exchange and by direct heat exchange with the steam passing into the reformate. This feature of the invention further facilitates rapid response.

The apparatus and processes of this invention, because of their inherent broad throughput capabilities, can be used with other heat transfer operations. In one aspect of the invention, the reformate is cooled by indirect heat exchange with another process stream, for example, a stream being preheated for passage to the reformer.

In preferred aspects of this invention, the indirect heat exchanger and distributor are positioned in the conduit to provide adequately uniform cooling of the reformate. For the purposes of this invention, relatively uniform cooling exists where the performance of the shift catalyst is not unduly adversely affected such as by a decrease in carbon monoxide production by 10 percent or more by volume. In another preferred aspect of this invention, a plurality of steam distributors are provided to facilitate the admixing of the steam with the reformate.

The heat exchanger/distributor may be used at one for more of the following locations: between the reformer and the shift reactor; between catalyst stages of the shift reactor if more than one catalyst stage is used; or after the shift reactor to cool the effluent from the shift reactor.

Advantageously, the reformer and the shift reactor are close coupled such that substantially all cooling of the effluent from the reformer is provided by the indirect heat exchange and the introduced steam. By close coupling it is meant that the distance between the reformer and shift reactor is relatively short such that the surface area is available for significant heat loss to the environment. The close coupling is facilitated by the ability of the heat exchanger/distributor to quickly effect cooling. In more preferred aspects, the region of the shell between the reformer and the shift reactor has an external surface area to cross-sectional surface area of between about 1 to 20, say, 2 to 10, and the distance between the units is less than about 50, preferably less than about 30, centimeters. With compact units distance between the units is about 10 to 15 centimeters, and preferably closer to 5 centimeters.

Typically, a controller is provided in fluid communication with the heat exchanger/distributor to adjust the rate of introduction of water to maintain the admixture at a predetermined temperature for entry into the shift unit.

DETAILED DESCRIPTION OF THE INVENTION

Figure 1:
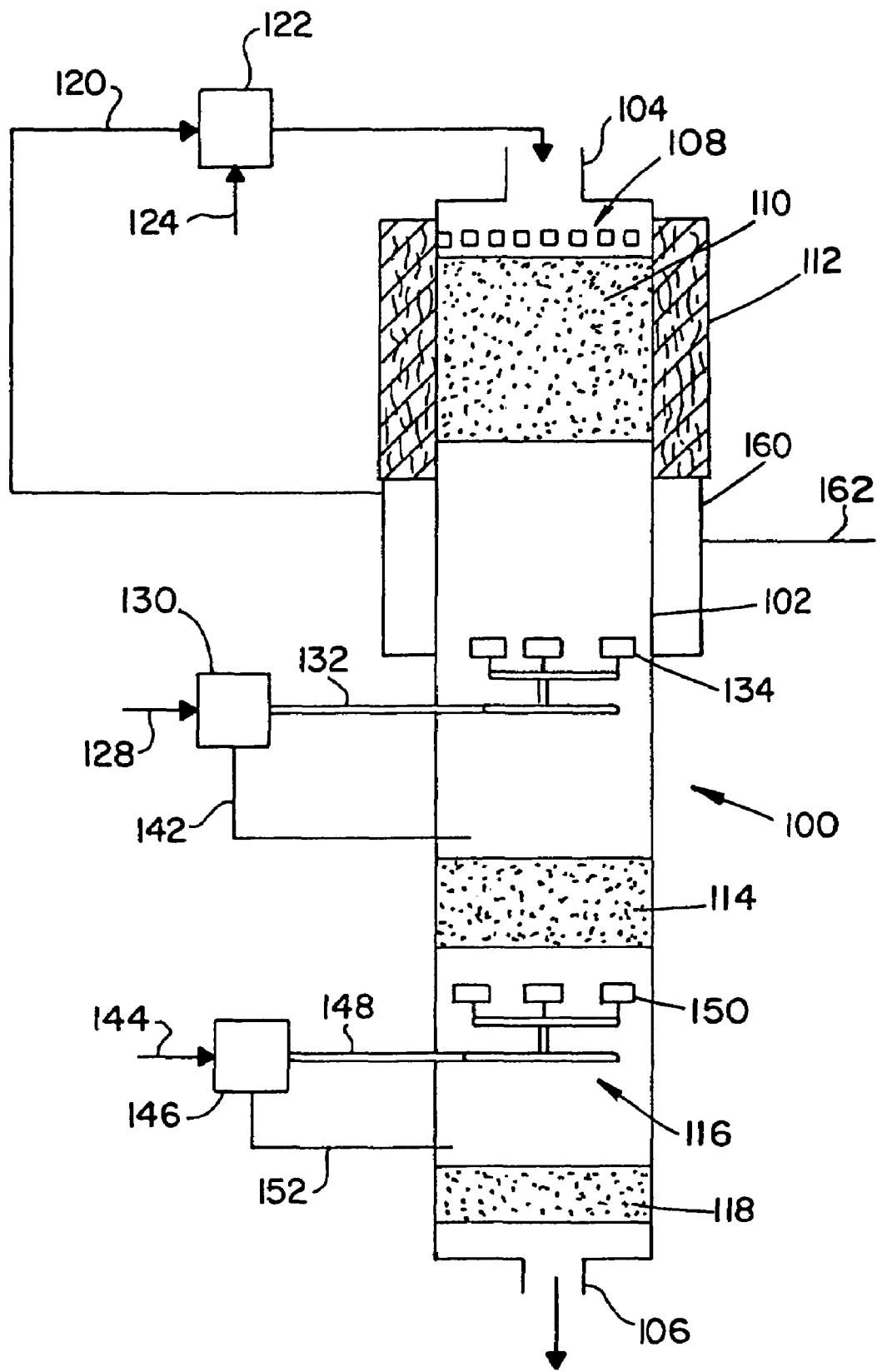
FIG. 1 is a cross sectional schematic representation of an apparatus in accordance with this invention having a high temperature water gas shift unit and a low temperature water gas shift unit.

The fuel for the generation of hydrogen is a hydrogen and carbon containing material such as natural gas, liquefied petroleum gas (LPG), butanes, gasoline, oxygenates (e.g., methanol, ethanol, and dimethyl ether), biogas, kerosene or naphtha (a gasoline boiling range material). The invention is particularly useful with natural gas or LPG. Natural gas, LPG and similar hydrocarbons, also generally contain impurities (including odorants) such as sulfur in the form of hydrogen sulfide, mercaptans, organosulfides, and the like which must be removed prior to introducing the feedstock to the steam reforming zone.

Water is used in the hydrogen generating process. In addition for some types of fuel cells, the hydrogen product must be delivered to the fuel cell as a wet gas. This is particularly true with PEM fuel cells, wherein the humidity of the hydrogen product stream is controlled to avoid drying out the PEM membrane in the fuel cell. The water preferably is deionized.

The fuel and steam, for a steam reformer, or fuel, steam and free oxygen, for an autothermal reformer, are fed to the hydrogen generator of this invention. The preparation of this feed, other than to achieve the desired fuel to oxygen and steam to fuel ratios, is not critical to this invention. The feed, or components of the feed, can be heated prior to entry into the hydrogen generator or within the hydrogen generator. In some instances it may be desired to heat the fuel prior to admixing with steam and oxygen, especially if the fuel is a liquid under normal conditions to vaporize it. The source of free oxygen for autothermal reforming may be pure oxygen, enriched air, or most conveniently, air.

Preferably, the ratio of steam to carbon in the feed is between about 1:1 and about 6:1, and more preferably, between about 2:1 and about 4:1, and most preferably, about 3:1. Typically, the amount of steam used is only that amount desired for the reforming reaction to minimize the amount of heat necessary to bring the feed to the reforming unit to reforming temperatures.

The overall partial oxidation and steam reforming reactions for methane are expressed by the formulae:

$$CH_4 + 0.5O_2 \rightarrow CO + 2H_2$$

$$CH_4 + H_2O \leftrightarrow CO + 3H_2$$

Steam reforming is a catalytic reaction producing hydrogen and carbon oxides (carbon dioxide and carbon monoxide) conducted under steam reforming conditions. Steam reforming conditions usually comprise temperatures in excess of 600° C., e.g., 650° C. to 1300° C., and sometimes 700° C. to 1100° C., and pressures of from about 1 to 25 bar absolute.

Partial oxidation reforming conditions typically comprise a temperature of from about 600° C. to about 1000° C., preferably about 600° C. to 800° C. and a pressure of from about 1 to about 25 bar absolute. The partial oxidation reforming is catalytic. The reformer may comprise two discrete sections, e.g., a first contact layer of oxidation catalyst followed by a second layer of steam reforming catalyst, or may be bifunctional, i.e., oxidation catalyst and steam reforming catalyst are intermixed in a single catalyst bed or are placed on a common support. The partial oxidation reformate comprises hydrogen, nitrogen (if air is used as the source of oxygen), carbon oxides (carbon monoxide and carbon dioxide), steam and some unconverted hydrocarbons.

The reformate, reforming effluent, is a gas and is passed to the shift reactor which contains at least one water gas shift reaction zone. The reformate is typically at temperatures in excess of about 600° C. as it exits the reformer. The reformate is cooled prior to being passed to the shift reactor to water gas shift conditions. In the shift reactor carbon monoxide is exothermically reacted in the presence of a shift catalyst in the presence of an excess amount of water to produce additional amounts of carbon dioxide and hydrogen. The shift reaction is an equilibrium reaction. The reformate thus has a reduced carbon monoxide content.

Although any number of water gas shift reaction zones may be employed to reduce the carbon monoxide level in the hydrogen product, two-zone water shift catalyst stages are often used. The first shift catalyst is for a high temperature shift at high temperature shift conditions comprising temperatures between about 320° C. and about 450° C. The effluent from the high temperature shift zone is fed to a low temperature shift zone operating at low temperature shift conditions. The effluent from the high temperature shift is cooled to temperatures suitable for the low temperature shift. The low temperature shift conditions usually comprise a temperature between about 180° C. and about 300° C.

The water gas shift effluent stream or hydrogen product typically comprises less than about 1, preferably less than about 0.5, mol-% carbon monoxide (on a dry basis). The effluent may be further treated in a suitable manner to remove further carbon monoxide (such as by selective oxidation of carbon monoxide to carbon dioxide) and excess water (as the amount of water required for the cooling of the reforming unit effluent exceeds that required for the shift reaction and for providing a wet gas).

One or more heat exchanger/distributors may be used in the processes and apparatus of the invention. Most frequently, the heat exchanger/distributors are used to cool the reformate prior to entering the water gas shift reactor and/or between shift reactor catalyst stages if two or more catalyst stages are used. If an additional heat exchange is used to cool the reformate, for instance, a heat exchanger used to heat the feed to the reformer, the heat exchanger/distributor usually is positioned further downstream.

Advantageously, the indirect heat exchanger is positioned within the conduit carrying the reformate such that the reformate is relatively uniformly cooled. Often, turbulence, including that induced by the presence of the indirect heat exchanger itself, results in the reformate mixing. Consequently, the configuration of the indirect heat exchanger is not critical and can be determined by the artisan for the given geometry of the cooling section and the reformate flow rates. To a significant extent, the configuration of the heat exchanger will be dictated by the amount of surface area needed to vaporize the water feed and the desire not to cause an undue pressure drop in the conduit.

The indirect heat exchanger provides sufficient surface area that under the range of expected operating conditions, vaporization of essentially all of the liquid water will occur. The determination of the required surface area can readily be determined for a given system, including the composition and range of throughputs for reformate, the temperature of the reformate, the temperature of the liquid water, pressure, and the heat transfer properties and coefficients for the material of the heat exchanger surface. Preferably, the surface area is in excess of that required to vaporize the liquid water.

In fluid communication with the indirect heat exchanger is at least one separator adapted to receive steam from the indirect heat exchanger and remove substantially all liquid water from the steam. The separator may be of any convenient design, including, but not limited to, vane-type separators, demister pads, and the like. It has been found that adequate liquid/vapor separation can be achieved by using a riser where any liquid entrained is either separated by gravity or contacts the surfaces of the riser (which are heated by the reformate) and vaporizes.

The separator is in fluid communication with at least one distributor to permit the steam pass from the heat exchanger/distributor into the reformate passing through the conduit. The number of distributors associated with the heat exchanger/distributor is preferably sufficient to enable a relatively uniform mixture of reformate and steam prior to the mixture contacting a downstream catalyst. Relatively uniform mixing occurs when the peak and minimum temperatures of the gases contacting the downstream catalyst are within about 50° C. Frequently, at least three, more preferably at least four, distributors are used. The distributors may be of any convenient design. The distributors may simply be openings or ports through which the steam passes may be nozzles or porous foam or wire pad structures. The distributors may be integral with the separators, that is, the separator and the distributor are the same structure, or may be separate structures.

DETAILED DESCRIPTION OF THE DRAWINGS

With reference to FIG. 1, the compact hydrogen generator 100, comprises cylindrical shell 102 having a first end defining port 104 and a second end defining port 106. The shell is shown as being continuous; however, it should be apparent that it may be constructed in sections so as to facilitate assembly and replacement of catalyst beds. The cross section of the shell may be in any suitable configuration. Cylindrical shell structures are most often used.

The fuel, steam and oxygen feed enters the compact hydrogen generator through port 104 and the gas flow proceeds through the shell in an axial direction. An optional distribution plate 108 is shown.

The reforming unit 110 comprises a bifunctional monolithic catalyst. The exterior of the shell at the region of the reforming unit 110 is surrounded by insulation 112. The insulation may extend around all or part of the remaining portions of the shell. Generally, insulation 112 has an R value of at least about 10, preferably at least about 30.

High temperature water gas shift unit 114 is spaced apart from the reforming unit 110 and defines a cooling zone in which the cooling of the reforming unit effluent occurs, steam is generated, and the steam and effluent are admixed. Preferably the units are in a close-coupled relationship, e.g., within about 3, preferably within about 2 shell diameters. For hydrogen generators useful for residential applications, the units are often within about 50, preferably within about 30, centimeters. In some aspects of the invention, the residence time based upon the gas velocity calculated using the inside cross sectional area of shell 102 is less than about 0.5 second. High temperature water gas shift unit 114 contains a monolithic high temperature shift catalyst.

As depicted, a low temperature water gas shift unit 118 is spaced apart from the high temperature water gas shift unit 114, and this zone 116 is also used for cooling, water vaporization and mixing of steam with the effluent from the high temperature water gas shift unit. Preferably the units are close-coupled as defined above. The low temperature water gas shift unit 118 also contains a monolithic catalyst.

Each of the three units is positioned within the shell such that gases passing therethrough do not by pass the catalysts. The hydrogen-containing effluent exits shell 102 via port 106.

Returning to the feed to the hydrogen generator, a mixture of fuel and steam is passed via line 120 to controller 122 which receives air via line 124. Controller 122 meters the amounts of fuel and air to be admixed in order to maintain the effluent from the reforming unit at a predetermined temperature. Controller 122 can also adjust the total amount of fuel being passed to the hydrogen generator. The overall amount of fuel introduced will be dependent upon the demand for hydrogen, and typically the controller is responsive to an indicator of demand, for instance, a sensing of the load on a fuel cell. The ratio of free oxygen to fuel can be based upon an algorithm correlated to hydrogen demand and/or the temperature of the reforming unit.

Water from line 128 is metered by controller 130 for introduction into the cooling zone subsequent to the reforming unit. The metered water passes through line 132 to heat exchanger/distributor 134 described in more detail in FIGS. 2 and 3.

Controller 130 is responsive to the temperature of the gases entering the high temperature water gas shift unit 114 as determined by thermocouple line 142.

The water injection system between the high temperature water gas shift unit 114 and the low temperature water gas shift unit 118 is similar to that described above and elements 144, 146, 148, 150 and 152 correspond to elements 128, 130, 132, 134 and 142, respectively.

Also depicted in FIG. 1 is an indirect heat exchanger 160 which surrounds a conduit of the shell 102 between the reforming unit 110 and heat exchanger/distributor 134. A fuel and steam mixture is passed via line 162 to heat exchanger 160. Alternatively, an air and steam mixture could be introduced into heat exchanger 160. By avoiding the presence of fuel, any coking problems associated with heating a fuel and steam mixture would thus be eliminated. The effluent from heat exchanger 160 is passed via line 120 to controller 122.

Figure 2:
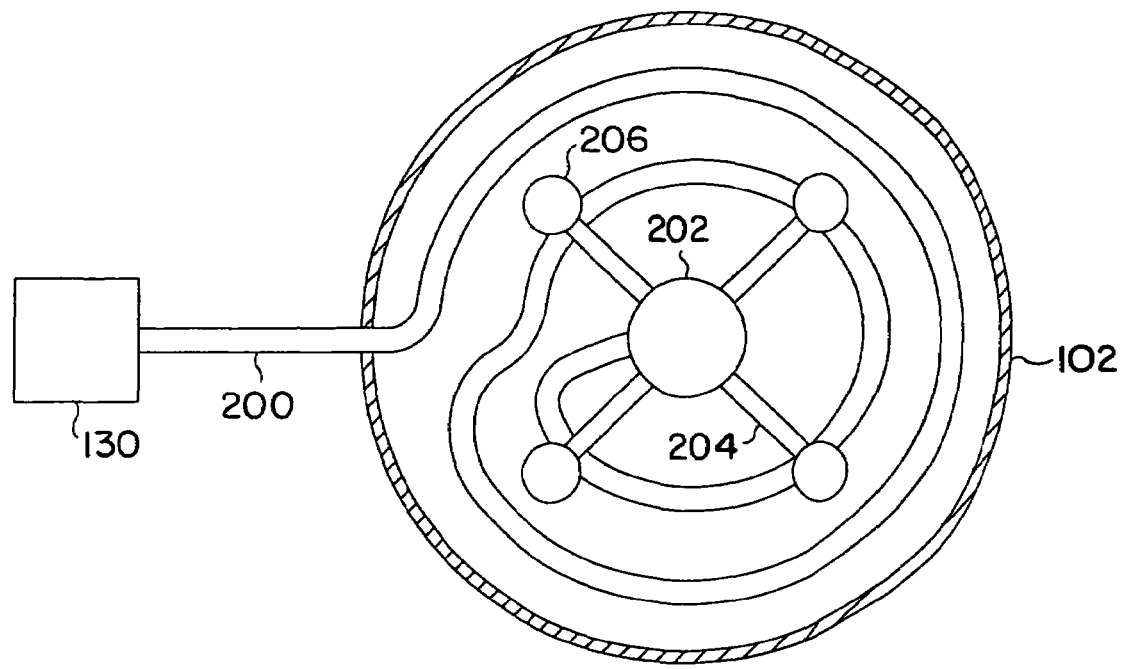
FIG. 2 is a schematic depiction viewed from the top of a heat exchanger/distributor used in the apparatus of FIG. 1.
Figure 3:
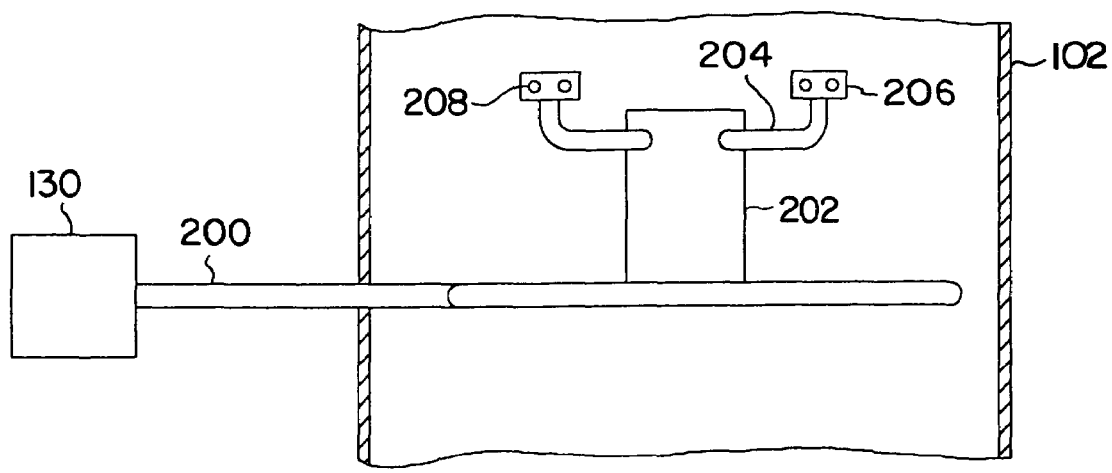
FIG. 3 is a cross-sectional view of the heat exchanger/distributor of FIG. 2.

FIGS. 2 and 3 depict a schematic top view and cross-section of the cooling zones between catalyst stages to further illustrate a heat exchanger/distributor in accordance with the invention. For the sake of ease of understanding, the same reference numerals will be used for all three drawings. The depictions will be for the heat exchanger/distributor 134. The same principles apply to heat exchanger/distributor 150.

Tube 200 passes from controller 130 into the interior of shell 102 where it is configured as spiral to both provide sufficient heat exchange area to vaporize the water and to aid in the uniform cooling of the effluent gases from the reforming unit. The distal end of tube 200 directs steam into riser 202. Riser 202 has four arms 204, with each arm terminated by a distributor 206. Openings 208 in each distributor allow the steam to enter the effluent from the reforming unit.

I claim:

1. A compact, hydrogen generator comprising:
   a shell having an inlet port, an outlet port and a conduit between the inlet port and the outlet port having a diameter;
   a reformer in the conduit adapted to convert a fuel into a reformate comprising hydrogen and carbon oxides;
   a shift reactor in the conduit downstream of the reformer spaced by a distance less than about three times the diameter having at least one catalyst stage adapted to convert carbon monoxide in the reformate to carbon dioxide and hydrogen;
   a heat exchanger/distributor in the conduit adapted to cool and inject steam into the reformate comprising:
   (a) an indirect heat exchanger comprising a coiled tube in the conduit adapted to receive liquid water, to vaporize the liquid water to steam, and to cool the reformate in the conduit,
   (b) a separator comprising a riser entirely within the conduit attached to the coiled tube adapted to receive steam from the coiled tube and to remove substantially all liquid water therefrom,
   (c) a steam distributor attached to the riser having an opening in fluid communication with the riser adapted to pass steam into the conduit, and
   (d) a plurality of steam distributors comprising arms attached to the riser.

2. The hydrogen generator of claim 1 further comprising a second heat exchanger/distributor in the conduit substantially identical in construction to the heat exchanger/distributor.

3. The hydrogen generator of claim 2 wherein the second heat exchanger/distributor is positioned upstream of the first heat exchanger/distributor.

4. The hydrogen generator of claim 1 wherein the plurality of steam distributors on the riser are in fluid communication with the riser.

5. The hydrogen generator of claim 1 wherein the heat exchanger/distributor is located between the reformer and the shift reactor.

6. The hydrogen generator of claim 1 wherein the shift reactor comprises at least two catalyst stages and the heat exchanger/distributor is located between the two catalyst stages.

7. The hydrogen generator of claim 1 wherein the coiled tube has a surface area sufficient to vaporize essentially all of the liquid water in the coiled tube to steam.

* * * * *